(12) United States Patent
Chang et al.

(10) Patent No.: US 11,864,071 B2
(45) Date of Patent: Jan. 2, 2024

(54) ELECTRONIC DEVICE WITH A GRAVITY SENSOR ASSISTED POSITIONING

(71) Applicant: Quanta Computer Inc., Taoyuan (TW)

(72) Inventors: Yan-Cheng Chang, Taoyuan (TW);
Po-Shan Kao, Taoyuan (TW);
Cheng-Yang Tseng, Taoyuan (TW);
Jia-Yang Tsao, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 278 days.

(21) Appl. No.: 17/128,375

(22) Filed: Dec. 21, 2020

(65) Prior Publication Data

US 2022/0109966 A1    Apr. 7, 2022

(30) Foreign Application Priority Data

Oct. 7, 2020   (TW) ................... 109134664

(51) Int. Cl.
*H04W 4/33*        (2018.01)
*H04W 4/38*        (2018.01)
*G01C 21/20*       (2006.01)

(52) U.S. Cl.
CPC ............ *H04W 4/33* (2018.02); *G01C 21/206* (2013.01); *H04W 4/38* (2018.02)

(58) Field of Classification Search
CPC ........... H04W 4/38; H04W 4/70; H04W 4/80; H04W 4/02; H04W 4/029; H04W 4/027; H04W 24/10; H04W 4/90; H04W 4/08; H04W 64/006; H04W 4/33; H04W 52/0254; H04W 88/02; G01S 15/60; G01C 21/20; G01C 21/10; G01C 21/206
See application file for complete search history.

(56) References Cited

U.S. PATENT DOCUMENTS

| | | | | |
|---|---|---|---|---|
| 2011/0202225 A1* | 8/2011 | Willis | ................. | G01C 25/005 702/85 |
| 2014/0172361 A1* | 6/2014 | Chiang | ................. | G01C 21/16 702/160 |
| 2015/0211863 A1* | 7/2015 | Kourogi | ................. | G01C 21/16 702/141 |
| 2020/0322755 A1* | 10/2020 | Berggren | ............... | H04W 4/02 |

* cited by examiner

*Primary Examiner* — Srilakshmi K Kumar
*Assistant Examiner* — Jing Gao
(74) *Attorney, Agent, or Firm* — McClure, Qualey & Rodack, LLP

(57) ABSTRACT

An electronic device includes an indoor positioning tag and an indoor positioner. The indoor positioning tag includes a gravity sensor. The indoor positioning tag determines whether to start to transmit a wireless signal according to the acceleration magnitude, the acceleration direction, and the duration of acceleration change detected by the gravity sensor, and adjusts the frequency of the transmission interval of the wireless signal.

7 Claims, 4 Drawing Sheets

ELECTRONIC DEVICE WITH A GRAVITY SENSOR ASSISTED POSITIONING

CROSS REFERENCE TO RELATED APPLICATIONS

This application claims priority to and the benefit of Taiwan Application No. 109134664, filed on Oct. 7, 2020, the entirety of which is incorporated by reference herein.

FIELD OF THE INVENTION

The invention relates to an electronic device, especially one relating to an electronic device with a gravity sensor assisted positioning.

DESCRIPTION OF THE RELATED ART

In the application of indoor positioning, an indoor positioning wireless tag continuously transmits wireless signals via its own wireless signal transmitter, and the wireless signals are received by an indoor positioning wireless receiver. The indoor positioning wireless receiver sends data contained in the received wireless signal to a back-end positioning engine server to calculate positions. Generally, the above-mentioned indoor positioning system usually only focuses on two things, that is, signal acquisition and algorithm calculation.

However, different algorithms have their own advantages and disadvantages, blind points, and usage restrictions, and they are difficult to be perfect.

BRIEF SUMMARY OF THE INVENTION

In order to resolve the issue described above, an embodiment of the invention provides an electronic device. The electronic device includes an indoor positioning tag and an indoor positioner. The indoor positioning tag includes a gravity sensor. The indoor positioning tag determines whether to start to transmit a wireless signal according to the acceleration magnitude, the acceleration direction, and the duration of acceleration change detected by the gravity sensor, and adjusts the frequency of the transmission interval of the wireless signal.

BRIEF DESCRIPTION OF THE DRAWINGS

The invention can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration.

DETAILED DESCRIPTION OF THE INVENTION

Figure 1:
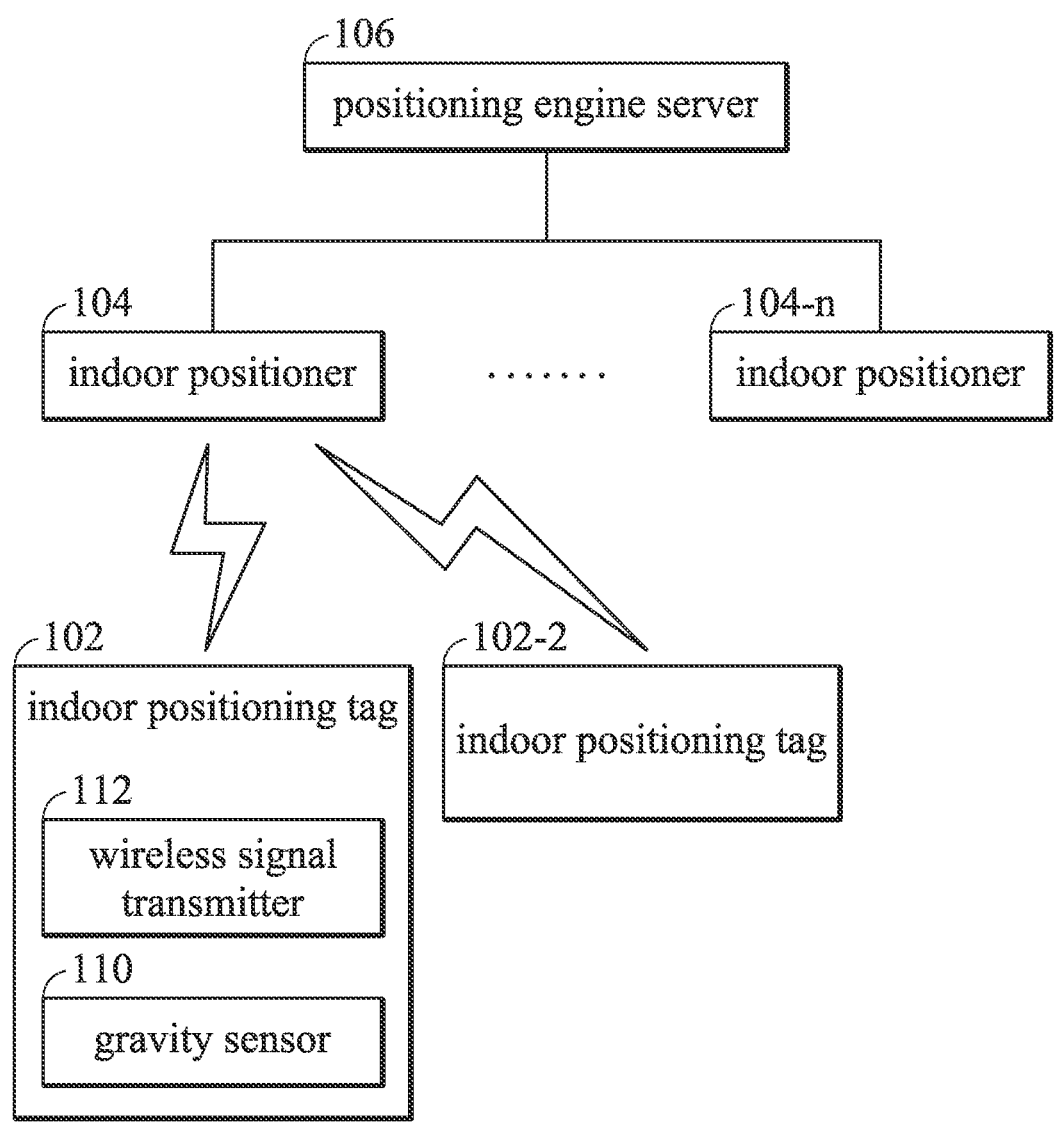
FIG. 1 shows a schematic diagram of an indoor positioning system in accordance with some embodiments of the disclosure.

FIG. 1 shows a schematic diagram of an indoor positioning system 100 in accordance with some embodiments of the disclosure. As shown in FIG. 1, the indoor positioning system 100 includes a plurality of indoor positioning tags (such as indoor positioning tags 102 and 102-2), a plurality of indoor positioners (such as indoor positioners 104, . . . , 104-n), and an positioning engine server 106. In some embodiments, the indoor positioning tags 102 and 102-2 can be installed on user's device. For example, the indoor positioning tags 102 and 102-2 can be built in a smart mobile device worn by the user or in a card for identification. The indoor positioning tags 102 and 102-2 may continuously and periodically transmit wireless signals to the indoor positioners 104 and 104-2 installed at different positions under certain specific conditions as the user moves. Each of the indoor positioning tags 102 and 102-2, taking the indoor positioning tag 102 as an example, includes a gravity sensor 110 and a wireless signal transmitter 112. In some embodiments, the wireless signal transmitter 112 is used to periodically transmit a Bluetooth beacon under the certain specific conditions. In some embodiments, the indoor positioning tag 102 determines whether to start transmitting the wireless signal according to the acceleration magnitude, the acceleration direction, and the duration of acceleration change detected by the gravity sensor 110, and dynamically adjusts the frequency of the transmission interval of the wireless signal. The wireless signal (which may be a Bluetooth beacon) carries information about the acceleration magnitude, the acceleration direction, and the duration of acceleration change (such as the indoor positioning tag 102 of the smart mobile device).

In some embodiments, the indoor positioners 104, . . . , 104-n may be installed in different positions in indoor space (for example, in a corridor, a corner of a walkway, a staircase, or a room). Generally, each of the indoor positioners 104, . . . , 104-n has an array antenna to receive the wireless signal transmitted from the indoor positioning tags 102 and 102-2. Taking the indoor positioner 104 as an example, the indoor positioner 104 receives the wireless signal from the indoor positioning tags 102 and 102-2, and determines whether the indoor positioning tags 102 and 102-2 are stationary state or moving state, according to information about the acceleration magnitude, the acceleration direction, and the duration of acceleration change. In some embodiments, the indoor positioner 104 further calculates the angles of arrival of the indoor positioning tags 102 and 102-2 according to the reception intensity and the reception phase from the received wireless signal, and sends the angles of arrival to the positioning engine server 106. The positioning engine server 106 calculates and determines the position of each of the indoor positioning tags 102 and 102-2 according to the angles of arrival, and finally completes the positioning of the indoor positioning tags 102 and 102-2.

Figure 2A:
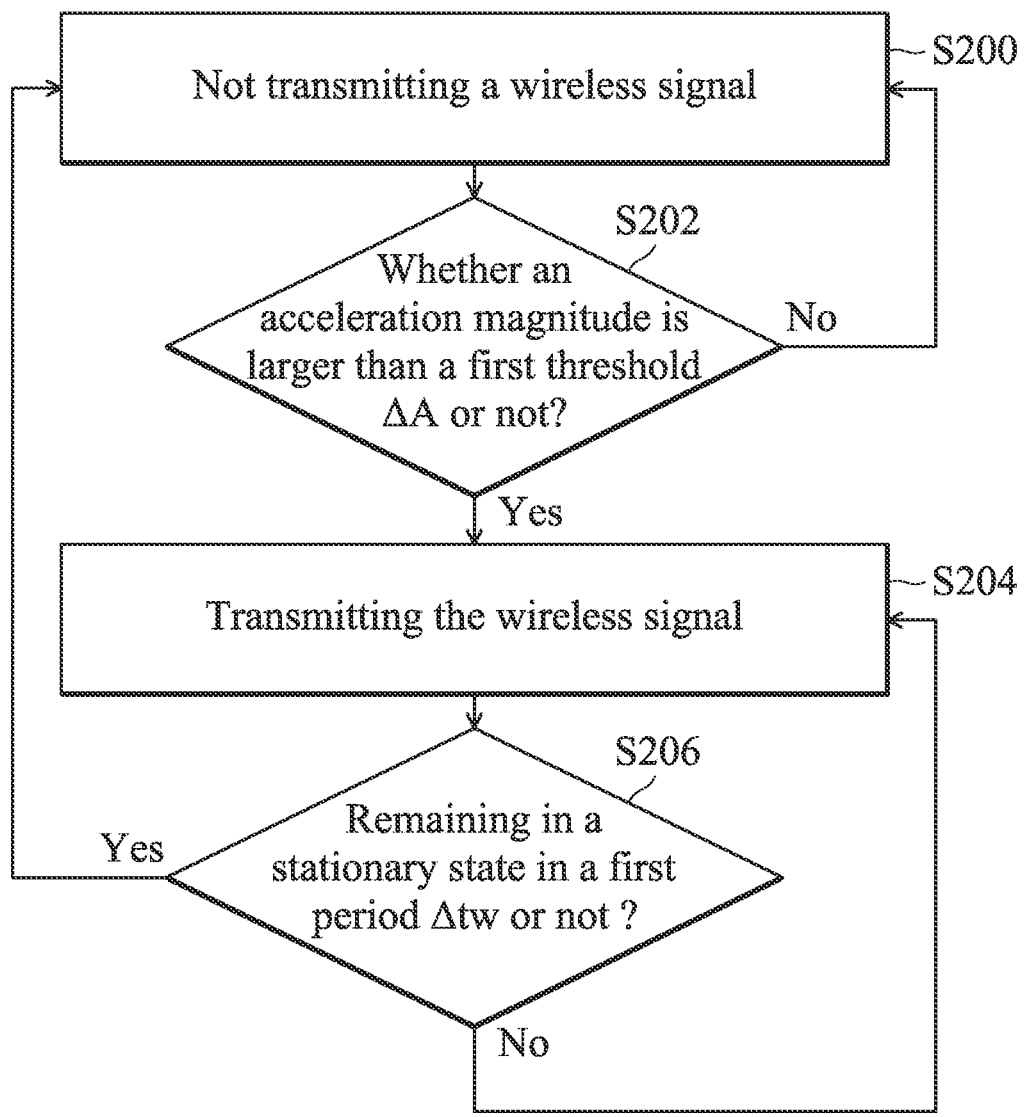
FIG. 2A shows a flow chart of an indoor positioning tag in FIG. 1 determining whether to transmit a wireless signal in accordance with some embodiments of the disclosure.
Figure 2B:
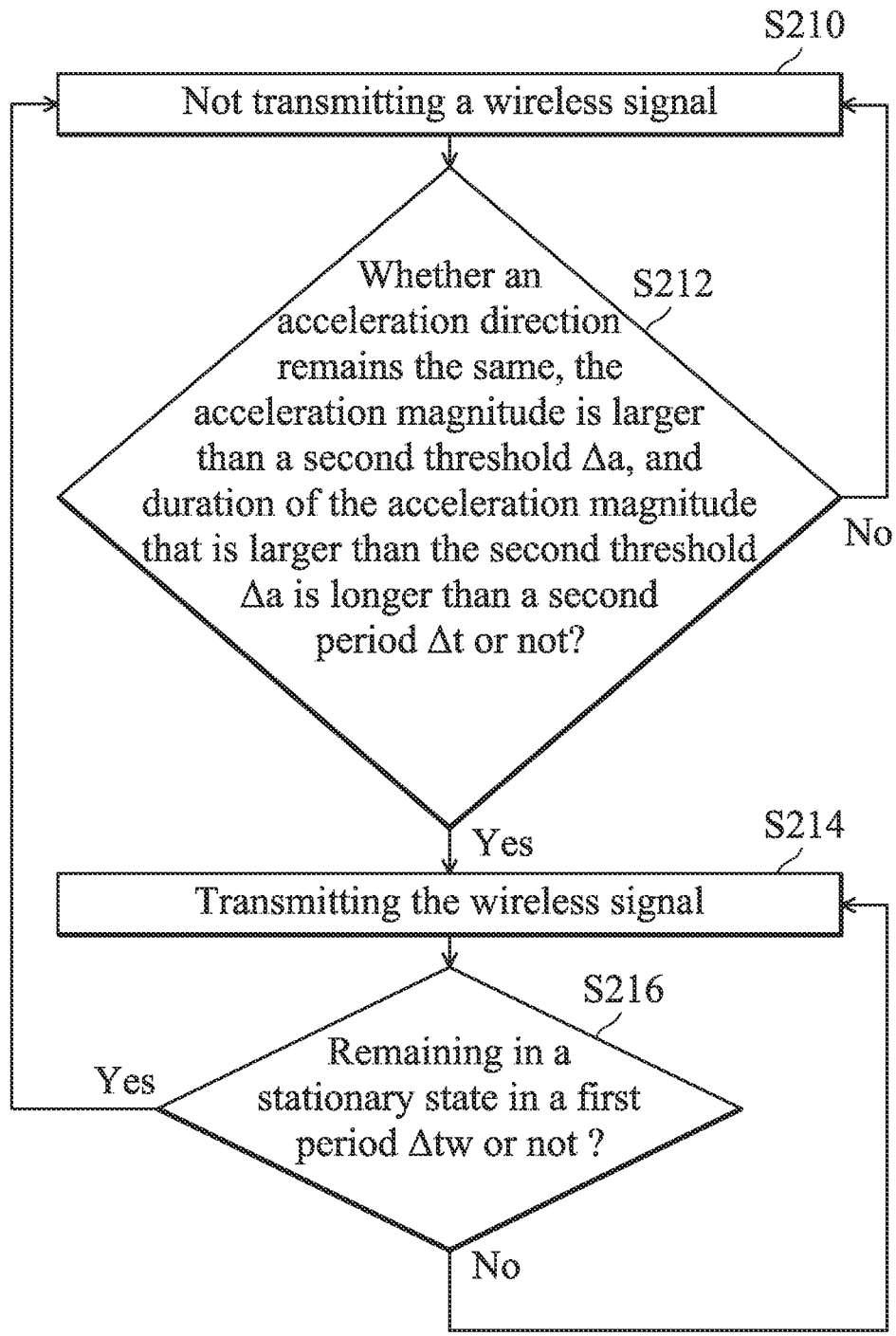
FIG. 2B shows a flow chart of the indoor positioning tag in FIG. 1 determining whether to transmit the wireless signal in accordance with some embodiments of the disclosure.

The indoor positioning tag 102 in the indoor positioning system 100 of the present invention may reduce network traffic congestion in steps S200 to S206 in FIG. 2A and steps S210 to S216 in FIG. 2B. The indoor positioning tag 102 in the indoor positioning system 100 of the present invention may dynamically adjust the frequency of the transmission interval in steps S300~S316.

FIG. 2A shows a flow chart of an indoor positioning tag 102 in FIG. 1 determining whether to transmit a wireless signal in accordance with some embodiments of the disclosure. As shown in FIG. 2A, in the initial state of the indoor positioning tag 102, the indoor positioning tag 102 does not transmit a wireless signal carrying information about acceleration magnitude, acceleration direction, and duration of acceleration change to the indoor positioner 104 (step S200). Then, in step S202, the indoor positioning tag 102 determines whether to start transmitting the wireless signal according to whether the acceleration magnitude detected by its own gravity sensor 110 is larger than a threshold ΔA. For example, when the acceleration magnitude is larger than the threshold ΔA (that is, "Yes" in step S202), the indoor positioning tag 102 starts to transmit the wireless signal to the indoor positioner 104. When the acceleration magnitude is less than or equal to the threshold ΔA (that is, "No" in step S202), the indoor positioning tag 102 still does not transmit the wireless signal to the indoor positioner 104 (back to step S200).

After that, the indoor positioning tag 102 determines whether it has remained stationary (i.e. stationary state) during a first period Δtw according to the acceleration magnitude provided by the gravity sensor 110, and determines whether to transmit the wireless signal again according to the above determination result. For example, when the indoor positioning tag 102 remains stationary in the first period Δtw (that is, "Yes" in step S206), the indoor positioning tag 102 stops transmitting the wireless signal (that is, returning back to step S200) for reducing the battery power consumption of the indoor positioning tag 102. When the indoor positioning tag 102 does not remain stationary in the first period Δtw (that is, "No" in step S206), the indoor positioning tag 102 keeps transmitting the wireless signal (that is, returning back to step S204).

In some embodiments, that the indoor positioning tag 102 executes the steps in the flow chart of FIG. 2A (event trigger report) is called a general mode.

In a specific embodiment, if the variation of acceleration magnitude change is within 5%, it can be regarded as stationary.

FIG. 2B shows a flow chart of the indoor positioning tag 102 in FIG. 1 determining whether to transmit the wireless signal in accordance with some embodiments of the disclosure. As shown in FIG. 2B, in the initial state of the indoor positioning tag 102, the indoor positioning tag 102 does not transmit a wireless signal carrying information about acceleration magnitude, acceleration direction, and duration of acceleration change to the indoor positioner 104 (step S210). Then, in step S212, the indoor positioning tag 102 determines whether to start transmitting the wireless signal according to the acceleration magnitude, the acceleration direction, and the duration of the acceleration change detected by the gravity sensor 110. For example, when the acceleration direction keeps the same, the acceleration magnitude is larger than a threshold Δa, and the duration of the acceleration magnitude larger than the threshold Δa is longer than a second period Δt (that is, "Yes" in step S212), the indoor positioning tag 102 starts to transmit the wireless signal to the indoor positioner 104 (step S214). When the acceleration direction is not consistent, or the acceleration magnitude is less than or equal to the threshold Δa, or the duration of the acceleration magnitude larger than the threshold Δa is not longer than the second period Δt (that is, "No" in step S212), the indoor positioning tag 102 does not transmit the wireless signal to the indoor positioner 104 (that is, returning back to step S210).

After that, the indoor positioning tag 102 determines whether it has remained stationary during the first period Δtw according to the acceleration magnitude provided by the gravity sensor 110. For example, when the indoor positioning tag 102 remains stationary in the first period Δtw (that is, "Yes" in step S216), the indoor positioning tag 102 stops transmitting the wireless signal (that is, returning back to step S210) for reducing the battery power consumption of the indoor positioning tag 102. When the indoor positioning tag 102 does not remain stationary in the first period Δtw (that is, "No" in step S216), the indoor positioning tag 102 keeps transmitting the wireless signal (that is, returning back to step S214).

In some embodiments, the indoor positioning tag 102 that executes the steps in the flow chart of FIG. 2B (event trigger report) is called a map fence application mode.

In some embodiments, the indoor positioning tag 102 may simultaneously execute the general mode in FIG. 2A and the map fence application mode in FIG. 2B to send the wireless signal to the indoor positioner 104. In other words, when the indoor positioning tag 102 detects that its acceleration information meets one of the conditions of step S202 or step S212, the indoor positioning tag 102 may start to transmit the wireless signal to the indoor positioner 104. The operation mode in which the indoor positioning tag 102 simultaneously executes the general mode of FIG. 2A and the map fence application mode of FIG. 2B is referred to a hybrid application mode.

Figure 3:
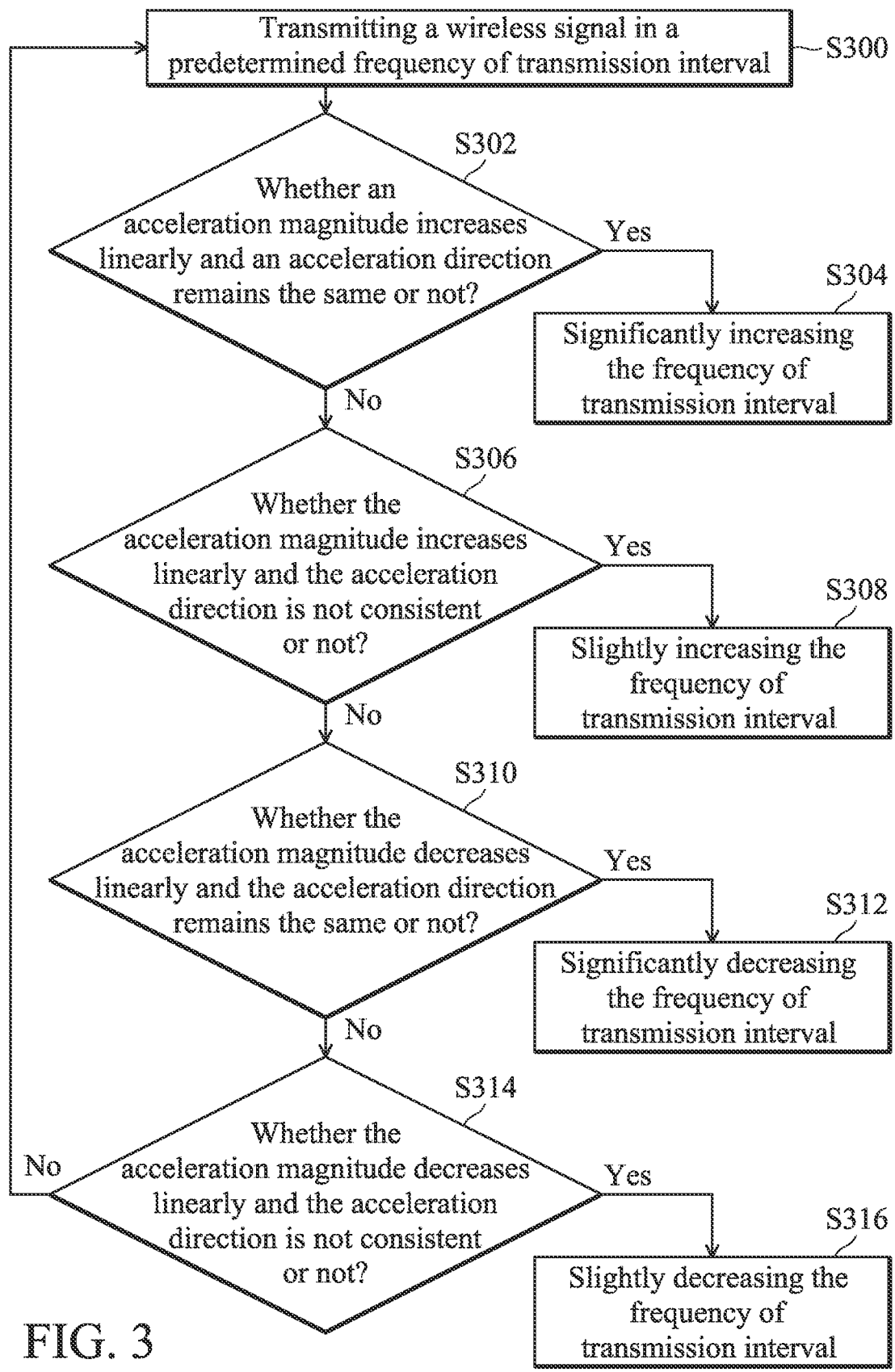
FIG. 3 shows a flow chart of the indoor positioning tag in FIG. 1 dynamically adjusting the frequency of the transmission interval of the wireless signal in accordance with some embodiments of the disclosure.

After the indoor positioning tag 102 of FIG. 1 starts to transmit the wireless signal to the indoor positioner 104, the indoor positioning tag 102 may dynamically adjust the frequency of the transmission interval of the wireless signal according to the acceleration magnitude, the acceleration direction, and the duration of acceleration change. FIG. 3 show a flow chart of the indoor positioning tag 102 in FIG. 1 dynamically adjusting the frequency of the transmission interval of the wireless signal in accordance with some embodiments of the disclosure. In some embodiments, the indoor positioning tag 102 transmits a wireless signal to the indoor positioner 104 in a predetermined frequency ($f_i$) of transmission interval (step S300). Then, the indoor positioning tag 102 determines whether the acceleration magnitude increases linearly and whether the acceleration direction remains the same (step S302). When the indoor positioning tag 102 determines that the acceleration magnitude increases linearly and the acceleration direction remains the same (that is, "Yes" in step S302), the indoor positioning tag 102 significantly increases the frequency of the transmission interval (step S304). For example, the indoor positioning tag 102 adjusts the predetermined frequency ($f_i$) of transmission interval up to a first frequency ($f_i+2*\Delta f$), wherein Δf is a gradient increase value of the frequency of transmission interval. In other words, when the conditions of step S302 are met, it means that the user (the indoor positioning tag 102) moves faster and faster with in spatial coordinates. Therefore, the indoor positioning tag 102 must correspondingly increase the frequency of the transmission interval to accurately calculate the positioning. When the indoor positioning tag 102 determines that the acceleration magnitude does not increase linearly or the acceleration direction is not consistent (that is, "No" in step S302), the indoor positioning tag 102 executes the subsequent step S306.

In step S306, the indoor positioning tag 102 determines whether the acceleration magnitude from the gravity sensor 110 (during an observation period) increases linearly, and the acceleration direction is not consistent (step S306). When the indoor positioning tag 102 determines that the acceleration magnitude increases linearly, and the acceleration direction is not consistent, (that is, "Yes" in step S306), the indoor positioning tag 102 slightly increases the frequency of transmission interval (step S308). For example, the indoor positioning tag 102 adjusts the predetermined frequency ($f_i$) of transmission interval up to a second frequency ($f_i+\Delta f$). In some embodiments, the first frequency ($f_i+2*\Delta f$) in step S304 is higher than the second frequency ($f_i+\Delta f$) in step S308. In other words, when the conditions of step S306 are met, it means that the user (the indoor positioning tag 102) moves irregularly within the spatial coordinates, so the indoor positioning tag 102 can correspondingly and slightly increases the frequency of transmission interval. When the indoor positioning tag 102 determines that the acceleration magnitude does not increase linearly, or the acceleration direction remains the same (that is, "No" in step S306), the indoor positioning tag 102 executes the subsequent step S310.

In step S310, the indoor positioning tag 102 determines whether the acceleration magnitude from the gravity sensor 110 decreases linearly, and the acceleration direction remains the same (step S310). When the indoor positioning tag 102 determines that the acceleration magnitude decreases linearly and the acceleration direction remains the same (that is, "Yes" in step S310), the indoor positioning tag 102 significantly decreases the frequency of the transmission interval (step S312). For example, the indoor positioning tag 102 adjusts the predetermined frequency ($f_i$) of transmission interval down to a third frequency ($f_i-2*\Delta f$), wherein $-\Delta f$ is a gradient decrease value of the frequency of transmission interval. In other words, when the conditions of step S310 are met, it means that the user (the indoor positioning tag 102) moves slower and slower with in spatial coordinates. Therefore, the indoor positioning tag 102 must correspondingly decrease the frequency of the transmission interval to achieve power saving. When the indoor positioning tag 102 determines that the acceleration magnitude does not decrease linearly or the acceleration direction is not consistent (that is, "No" in step S310), the indoor positioning tag 102 executes the subsequent step S314.

In step S314, the indoor positioning tag 102 determines whether the acceleration magnitude from the gravity sensor 110 decreases linearly, and the acceleration direction is not consistent (step S314). When the indoor positioning tag 102 determines that the acceleration magnitude decreases linearly, and the acceleration direction is not consistent (that is, "Yes" in step S314), the indoor positioning tag 102 slightly decreases the frequency of the transmission interval (step S316). For example, the indoor positioning tag 102 adjusts the predetermined frequency ($f_i$) of transmission interval down to a fourth frequency ($f_i-\Delta f$). In some embodiments, the fourth frequency ($f_i-\Delta f$) in step S316 is higher than the third frequency ($f_i-2*\Delta f$) in step S312. In other words, when the conditions of step S314 are met, it means that the moving speed of the user (the indoor positioning tag 102) with the spatial coordinates is also slower and slower, but the moving direction is difficult to predict, so the indoor positioning tag 102 slightly decreases the frequency of transmission interval. In some embodiments, the indoor positioning tag 102 determines that the acceleration magnitude does not decrease linearly or the acceleration direction remains the same (that is, "No" in step S314), the indoor positioning tag 102 keeps transmitting the wireless signal to the indoor positioner 104 in the predetermined frequency ($f_i$) of transmission interval.

In a specific embodiment, when the conditions of step S302 are met and step S304 is executed, the indoor positioning tag 102 further transmits a first flag (for example, a flag for indicating significantly increasing frequency) to the indoor positioner 104 via the wireless signal. After receiving the first flag, the indoor positioner 104 also significantly increases the frequency of receiving interval and the positioning frequency (for example, changing the frequency of receiving interval and the positioning frequency to the first frequency). When the conditions of step S306 are met and step S308 is executed, the indoor positioning tag 102 also transmits a second flag (for example, a flag for indicating slightly increasing frequency) to the indoor positioner 104 via the wireless signal. After receiving the second flag, the indoor positioner 104 correspondingly and slightly increases the frequency of receiving interval and the positioning frequency (for example, changing the frequency of receiving interval and the positioning frequency to the second frequency).

Similarly, when the conditions of step S310 are met and step S312 is executed, the indoor positioning tag 102 further transmits a third flag (for example, a flag for indicating significantly decreasing frequency) to the indoor positioner 104 via the wireless signal. After receiving the third flag, the indoor positioner 104 correspondingly and significantly decreases the frequency of receiving interval and the positioning frequency (for example, changing the frequency of receiving interval and the positioning frequency to the third frequency). When the conditions of step S314 are met and step S316 is executed, the indoor positioning tag 102 also transmits a fourth flag (for example, a flag for indicating slightly decreasing frequency) to the indoor positioner 104 via the wireless signal. After receiving the fourth flag, the indoor positioner 104 correspondingly and slightly decreases the frequency of receiving interval and the positioning frequency (for example, changing the frequency of receiving interval and the positioning frequency to the fourth frequency).

The indoor positioner 104 in FIG. 1 may determine whether the indoor positioning tag 102 is stationary or moving, according to information about the acceleration magnitude, the acceleration direction, and the duration of acceleration change from the indoor positioning tag 102. In some embodiments, the indoor positioner 104 may directly determine whether the indoor positioning tag 102 is stationary or moving, according to whether the acceleration magnitude of the indoor positioning tag 102 is zero. For example, when the acceleration magnitude is not equal to zero, the indoor positioner 104 determines that the indoor positioning tag 102 is in the moving state. In contrast, when the acceleration magnitude is equal to zero, the indoor positioner 104 determines that the indoor positioning tag 102 is in the stationary state. In some embodiments, the indoor positioner 104 may also determine whether the indoor positioning tag 102 is stationary or moving according to whether the acceleration magnitude of the indoor positioning tag 102 is larger than a threshold $\Delta A_2$, and the duration of the acceleration magnitude that is larger than the threshold $\Delta A_2$ is longer than a period $\Delta t$. For example, when the acceleration magnitude is larger than the threshold $\Delta A_2$, and the duration of the acceleration magnitude that is larger than the threshold $\Delta A_2$ is longer than the period $\Delta t_2$, the indoor positioner 104 determines that the indoor positioning tag 102 is moving. In contrast, when the acceleration magnitude is less than or equal to the threshold $\Delta A_2$, or the duration of the acceleration magnitude that is larger than the threshold $\Delta A_2$ is shorter than the period $\Delta t_2$, the indoor positioner 104 determines that the indoor positioning tag 102 is stationary.

In some embodiments, the indoor positioner 104 calculates values for pitch, roll, and yaw using the acceleration information (including the acceleration magnitude, the acceleration direction, and the duration of acceleration change), and determines whether the movement or displacement of the indoor positioning tag 102 is reasonable based on the pitch value, the roll value and the yaw value. When the indoor positioner 104 determines that the movement of the indoor positioning tag 102 is reasonable, the indoor positioner 104 determines that the indoor positioning tag 102 is moving. When the indoor positioner 104 determines that the movement of the indoor positioning tag 102 is not reasonable, the indoor positioner 104 determines that the indoor positioning tag 102 is stationary. For example, suppose that the indoor positioning tag 102 is arranged on a large shelf (which cannot be easily moved). When the pitch value, the roll value and the yaw value calculated by the indoor positioner 104 based on the acceleration information about the indoor positioning tag 102 are valid values, such as not zero, since the indoor positioning tag 102 is set on a large shelf, it is unreasonable that the indoor positioning tag 102 has the pitch value, the roll value, or the yaw value. Thus, the indoor positioner 104 determines that the movement of the indoor positioning tag 102 is unreasonable, so that the indoor positioner 104 determines that the indoor positioning tag 102 is in the stationary state. In some embodiment, when the indoor positioner 104 determines that the movement of the indoor positioning tag 102 is unreasonable, the indoor positioner 104 may ignore the current acceleration information about the indoor positioning tag 102, and wait for the acceleration information at the next time point to confirm the actual movement state of the indoor positioning tag 102.

In some embodiments, the indoor positioning tag 102 in FIG. 1 determines whether to perform a coordinate axis calibration for the gravity sensor 110 according to the acceleration magnitude and the duration of acceleration change. In detailed, when the acceleration magnitude of the indoor positioning tag 102 changes and the duration of the change is longer than a period $\Delta t_3$ (calibration condition 1), the indoor positioning tag 102 performs the coordinate axis calibration for the gravity sensor 110. In some embodiments, the indoor positioning tag 102 inputs the gravity raw data output by the gravity sensor 110 (for example, the gravity sensor outputs 60 gravity raw data every minute) into a motion-detection algorithm, which is used to determine whether it is moving or not. In some embodiments, the indoor positioning tag 102 includes a processor (not shown) that executes the motion-detection algorithm and determines whether it is moving or not. The gravity raw data directly corresponds to the acceleration magnitude, the acceleration direction, and the duration of the acceleration change of the indoor positioning tag 102.

In some embodiments, when the indoor positioning tag 102 determines that it is moving, according to the results of the motion-detection algorithm, and the duration of the movement is longer than the period $\Delta t_4$ (calibration condition 2), the indoor positioning tag 102 may perform a coordinate axis calibration for the gravity sensor 110. Since the indoor positioning tag 102 may consumes a lot of battery power while performing the coordinate axis calibration for the gravity sensor 110, the indoor positioning tag 102 may not perform a coordinate axis calibration for the gravity sensor 110 until the calibration condition 1 is met, or both of the calibration conditions 1 and 2 are met.

The electronic device of the present invention can achieve the following effects: (1) improve the positioning accuracy of the indoor positioner 104 or the indoor positioning engine server 106 in FIG. 1; (2) save the radio resources and battery power of the indoor positioning tag 102 in FIG. 1; (3) reduce the risk of network congestion.

The ordinals in the specification and the claims of the present invention, such as "first", "second", "third", etc., have no sequential relationship, and are just for distinguishing between two different components with the same name. In the specification of the present invention, the word "couple" refers to any kind of direct or indirect electronic connection. The present invention is disclosed in the preferred embodiments as described above, however, the breadth and scope of the present invention should not be limited by any of the embodiments described above. Persons skilled in the art can make small changes and retouches without departing from the spirit and scope of the invention. The scope of the invention should be defined in accordance with the following claims and their equivalents.

What is claimed is:

1. An electronic device, comprising:
   an indoor positioning tag, configured to transmit a wireless signal including an acceleration magnitude, an acceleration direction, and a duration of acceleration change;
   wherein the indoor positioning tag comprises a gravity sensor; the indoor positioning tag determines whether to start to transmit the wireless signal according to the acceleration magnitude, the acceleration direction, and the duration of acceleration change detected by the gravity sensor, and adjusts a frequency of transmission interval of the wireless signal;
   wherein the indoor positioning tag determines whether to perform a coordinate axis calibration for the gravity sensor according to the acceleration magnitude and the duration of acceleration change;
   wherein when the acceleration direction remains the same, the acceleration magnitude is larger than a first threshold, and the duration of the acceleration magnitude that is larger than the first threshold is longer than a first period, the indoor positioning tag starts to transmit the wireless signal; and
   when the indoor positioning tag remains in a stationary state in a second period, the indoor positioning tag stops transmitting the wireless signal.

2. The electronic device as claimed in claim 1, further comprising:
   an indoor positioner, configured to receive the wireless signal, and determining whether the indoor positioning tag is in the stationary state or in a moving state according to the acceleration magnitude, the acceleration direction, and the duration of acceleration change.

3. The electronic device as claimed in claim 2, wherein when the acceleration magnitude is not equal to zero, the indoor positioner determines that the indoor positioning tag is in the moving state; or
   when the acceleration magnitude is larger than a second threshold, and the duration of the acceleration magnitude that is larger than the second threshold is longer than a third period, the indoor positioner determines that the indoor positioning tag is in the moving state.

4. The electronic device as claimed in claim 2, wherein the indoor positioner calculates a pitch value, a roll value, and a yaw value for the indoor positioning tag according to the acceleration magnitude, the acceleration direction, and the duration of acceleration change to judge whether or not movement or displacement of the indoor positioning tag is reasonable;

the indoor positioner judges the movement or displacement of the indoor positioning tag is unreasonable if the indoor positioning tag is arranged on a stationary object and the pitch value, the roll value, and the yaw value for the indoor positioning tag are nonzero valid values.

5. The electronic device as claimed in claim 4, wherein
when the indoor positioner judges the movement or displacement of the indoor positioning tag is reasonable, the indoor positioner determines that the indoor positioning tag is in the moving state;
when the indoor positioner judges the movement or displacement of the indoor positioning tag is not reasonable, the indoor positioner determines that the indoor positioning tag is in the stationary state.

6. The electronic device as claimed in claim 1, wherein
when the acceleration magnitude increases linearly and the acceleration direction remains the same, the indoor positioning tag increases the frequency of the transmission interval of the wireless signal by a first frequency value; and
when the acceleration magnitude increases linearly, and the acceleration direction is not consistent, the indoor positioning tag increases the frequency of the transmission interval of the wireless signal by a second frequency value; wherein the first frequency value is larger than the second frequency value.

7. The electronic device as claimed in claim 1, wherein
when the acceleration magnitude decreases linearly and the acceleration direction remains the same, the indoor positioning tag decreases the frequency of the transmission interval of the wireless signal by a third frequency value; and
when the acceleration magnitude decreases linearly, and the acceleration direction is not consistent, the indoor positioning tag decreases the frequency of the transmission interval of the wireless signal by a fourth frequency value; wherein the third frequency value is higher than the fourth frequency value.

* * * * *